United States Patent [19]
Föller et al.

[11] Patent Number: 5,457,640
[45] Date of Patent: Oct. 10, 1995

[54] METHOD OF CHECKING CONDENSATE DISCHARGERS

[75] Inventors: Werner Föller, Stuhr; Holm Klann; Günter Herbold, both of Bremen; Jürgen Klattenhoff, Delmenhorst, all of Germany

[73] Assignee: GESTRA Aktiengesellschaft, Bremen, Germany

[21] Appl. No.: 189,435

[22] Filed: Jan. 31, 1994

[30] Foreign Application Priority Data

Feb. 10, 1993 [DE] Germany .......................... 43 03 798.4

[51] Int. Cl.⁶ .................................................. G01H 17/00
[52] U.S. Cl. .......................... 364/551.01; 73/168; 73/592; 364/508; 364/509; 364/510; 364/550; 377/15; 377/16
[58] Field of Search ............................. 73/168, 590, 592; 364/508, 509, 510, 550, 551.01; 377/15, 16

[56] References Cited

U.S. PATENT DOCUMENTS

| | | | |
|---|---|---|---|
| 3,344,408 | 9/1967 | Singer et al. ........................ | 395/575 |
| 4,266,602 | 5/1981 | White et al. ........................ | 165/124 |
| 5,257,545 | 11/1993 | Au-Yang ........................ | 73/597 |
| 5,327,783 | 7/1994 | Au-Yang ........................ | 73/168 X |

FOREIGN PATENT DOCUMENTS

402463 12/1990 European Pat. Off. .

*Primary Examiner*—Edward R. Cosimano
*Attorney, Agent, or Firm*—Collard & Roe

[57] ABSTRACT

Method of testing the functionality of condensate dischargers. Any ultrasonic vibrations present in the condensate discharger are picked up with an ultrasonic vibration sensor and transformed into an electric output signal. The latter is compared in an evaluation unit with stored data. A test result is then formed based on predetermined decision criteria. The test is carried out over a predetermined test duration, within which instantaneous values of the ultrasonic vibrations are picked up at predetermined times and, if need be, smoothed. The test result is based on the instantaneous values.

17 Claims, 7 Drawing Sheets

Discharger: ABC

Place of installation: XYZ

| Test No. | Test Result | Mean Value | Limit Value | Threshold Value | Number of Closings | Foreign Sound | Quantity > Max |
|---|---|---|---|---|---|---|---|
| I | Discharger O.K. | 4.6 | 15 | 5 | 3 | NO | NO |
| II | Check Discharger | 18.7 | 15 | 5 | 0 | NO | NO |

FIG. 6C

METHOD OF CHECKING CONDENSATE DISCHARGERS

BACKGROUND OF THE INVENTION

1. Field of the Invention

The present invention relates to a method for using an ultrasonic vibration sensor for the testing and checking of condensate dischargers.

2. The Prior Art

Condensate dischargers are installed in plants generating or using steam in order to discharge collected condensate from the plant. When no condensate is present, they are expected to prevent the discharging of steam. Methods of checking condensate dischargers serve the purpose of controlling the functionality of the installed condensate dischargers, whereby the discharge of condensate is permitted, while the outflow of steam is prohibited.

EP OS 402 463 discloses a testing method wherein it has been found that the evaluation unit sometimes issues unreliable test results. Due to operating conditions within the equipment, it can occasionally happen that the condensate discharger receives a great surging flow of condensate. The amount of condensate then discharged by the condensate discharger is substantially greater than the normal flow-through capacity. Such a great flow-through of condensate results in ultrasonic vibrations in the condensate discharger and thus leads to an output signal by the ultrasonic vibration sensor of which the amplitude is in the same order of magnitude as when steam is flowing through the condensate discharger. If the condensate discharger is checked at the time of such a surging flow of condensate, the evaluation unit erroneously signals "through-flow of steam" with this prior art method, even though the tested condensate discharger discharges condensate and thus no functional error is present.

SUMMARY OF THE INVENTION

It is an object of the present invention to provide an ultrasonic testing method in connection with which erroneous test results are avoided to the greatest extent possible.

This object is achieved according to the present invention by providing a method of testing condensate dischargers, comprising bringing an ultrasonic vibration sensor into mechanical contact with a condensate discharger to be tested. Ultrasonic vibrations occur in the condensate discharger and are picked up and transformed into an electric output signal, and the output signal is compared in an evaluation unit with data stored in a memory. Test results are determined and issued on the basis of predetermined decision criteria. The instantaneous value of the output signal of the ultrasonic vibration sensor in the evaluation unit is detected at predetermined times and, upon expiration of the test duration, forming the test result in the evaluation unit based on at least one of the instantaneous values.

According to the method of the invention, the condensate discharger is checked not merely for a short time, but for a longer testing period over a predetermined testing duration. Using the method of the invention, a great number of instantaneous values of the output signal of the ultrasonic vibration sensor are detected. The predetermined test duration is substantially longer than, for example, the discharge duration for a condensate flow surge. Very high instantaneous values of the output signal—as caused by such a surge of condensate—occurring temporarily during the test duration do not lead to any erroneous test result in the evaluation unit.

Without change in the function of the condensate discharger, fluctuations may occur for a very brief time in the output signal of the ultrasonic vibration sensor, for example, conditioned by the plant or by the design of the condensate discharger. The brief variations of the actual value are smoothed, resulting in instantaneous values that are representative of the functioning of the condensate discharger. A particularly advantageous smoothing method is based upon using the mean, or average value, as the instantaneous value.

With condensate dischargers, a distinction can be made between continuously discharging devices and intermittently discharging devices. Continuously discharging condensate dischargers open in each case as far as it exactly conforms to the stream of condensate flowing in. They are consequently always opened as long as condensate is being collected. On the other hand, intermittently discharging condensate dischargers are always open very wide. Therefore, these intermittent ones are usually open wider than necessary to conform to the stream of condensate flowing in. Such condensate dischargers open only temporarily even when condensate is collected continuously, and close after the collected quantity of condensate has been discharged. They open again temporarily only after a sufficient amount of condensate has been collected again. Thus, the closing of a condensate discharger is an important indication of its functionality.

For this reason, each detected instantaneous value is compared in the evaluation unit with a lower threshold value. It is determined for the test result whether the tested condensate discharger has closed within the test duration and is thus functioning correctly. This is accomplished with the help of a lower threshold value below which the instantaneous values lie when the condensate discharger is closed. In this case, high instantaneous values are not taken into account in connection with the test result, so that a great surge of condensate, for example, will not lead to any wrong test result.

The individual vibration properties of the condensate discharger to be tested can be taken into account advantageously if a lower threshold value is individually stored in the memory for each condensate discharger to be checked. It is possible in this way to take into account even vibration influences, if any, from the connected plant which, for example, frequently still lead to a low vibration amplitude when the condensate discharger is closed.

A further embodiment of the method of the invention leads in certain cases to an optimized time of the test. The actual test duration is reduced to a value between the longer standard test time and a shorter minimum test time, namely, after the condensate discharger has closed at least once.

In another embodiment, the evaluation unit issues a negative test result with condensate dischargers of certain functional principles if the number of the closing actions within the test duration exceeds a predetermined maximum number. With condensate dischargers of certain functional principles, for example, thermodynamic ones, a very high closing frequency is an absolute indication of a functional defect.

In a further embodiment, there is the testing of a condensate discharger which discharges condensate in the normal amount during the entire test duration, for example, as a continuously discharging condensate discharger receiving a continuous stream of condensate. A correct test result is obtained wherein the mean value formed from the instantaneous values detected during the test duration represents a representative value for the functioning of the condensate discharger that is compared with an upper limit value. If, in accordance with another embodiment, an upper limit value is individually stored for each condensate discharger to be tested, the individual vibration properties of the condensate discharger can be taken into account in a particularly beneficial manner.

Ultrasonic vibrations detected on a condensate discharger must not necessarily originate from the condensate discharger to be tested. They may under certain circumstances also originate from another sound source, for example, from a throttling point in the feed conduit of the condensate discharger. In condensate dischargers which regularly receive the flow of very large quantities of condensate, no significant difference in amplitude can be found in the output signal of the ultrasonic vibration sensor between the discharge of condensate (therefore: correct function) and the flow-off of steam (therefore: flawed function).

In an additional embodiment, interfering influences are taken into account. If the mean value formed from the detected instantaneous values lies above the limit value, either a functional error of the condensate discharger is present, or interfering influences, for example, such as mentioned above, may exist.

The operator of the testing device is then required to input data on certain interfering influences. If, according to such inputs, certain interfering influences are not present, the evaluation unit issues a negative test result on the function of the condensate discharger being tested. On the other hand, if interfering influences are present, an interference report or a positive test result is issued, depending on the interfering influence.

In a further embodiment, it is possible to have the test data available during the test and immediately after a test. The test data for each tested condensate discharger can be reviewed again at any later time, namely, not only its test data from the last test, but also its test data from all previous tests. By comparing the test data from various tests, it is possible, for example, to readily detect any changes in the functioning of the condensate discharger.

In an additional embodiment, it is possible to obtain particularly comprehensive information about the tested condensate discharger.

In an additional embodiment, displaying all the instantaneous values on a display screen provides a detailed overview of all ultrasonic vibrations detected during the test. The limit value and/or threshold value of the condensate discharger, which is indicated as well, permits an evaluation of the functioning of the condensate discharger.

In a further embodiment, the values are represented on the display screen as a diagram, of which one coordinate represents the test duration time period and its other coordinate represents the amplitude of the ultrasonic vibrations.

Displaying the data obtained in the evaluation unit from the instantaneous values is a particularly advantageous method of observing the test result and the data and information on which such result is based. An overview of both the current test results and preceding test results of the condensate discharger is obtained by displaying all of the data in the format of a table of results.

By making use of a path-end switch, it is possible to prevent wrong test results in cases in which the ultrasonic vibration sensor is not in the proper contact with the condensate discharger to be tested.

BRIEF DESCRIPTION OF THE DRAWINGS

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
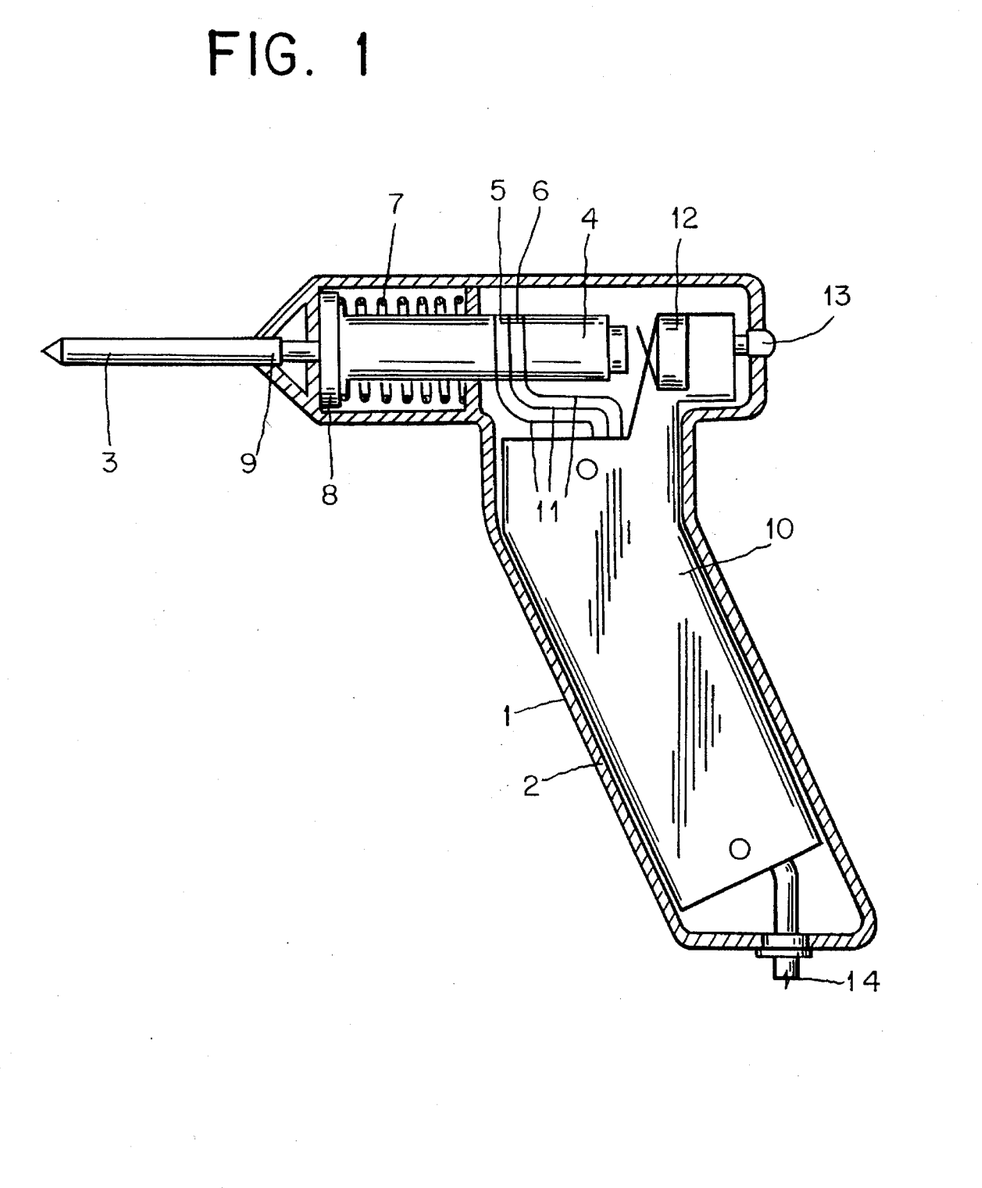
FIG. 1 shows an ultrasonic vibration sensor.

Turning now in detail to the drawings, FIG. 1 shows the ultrasonic vibration sensor 1 which has a sensor housing 2 with probe rod 3 projecting therefrom. In the sensor housing 2, a vibration transformer 4 is present, with which the probe rod 3 is rigidly connected at its end on the inner side of the housing, the transformer having the piezo elements 5, 6. The vibration transformer 4 is acted upon by a spring-elastic element 7, which axially loads the transformer in the direction of probe rod 3. The vibration transformer 4 and the probe rod 3 are arranged axially movable by stroke and fitted with two stops 8, 9 cooperating with the sensor housing 2. An electrical circuit unit 10 is arranged in the sensor housing 2 and the piezo elements 5, 6 are electrically connected to the unit via the conductors 11. The circuit unit 10 has a path-end switch 12 arranged ahead of the end of the vibration transformer 4 that is removed from the probe rod, as well as a signal lamp 13 projecting from the sensor housing 2. A transmission line 14 extending into the sensor housing 2 is electrically connected to the circuit unit 10.

Figure 2:
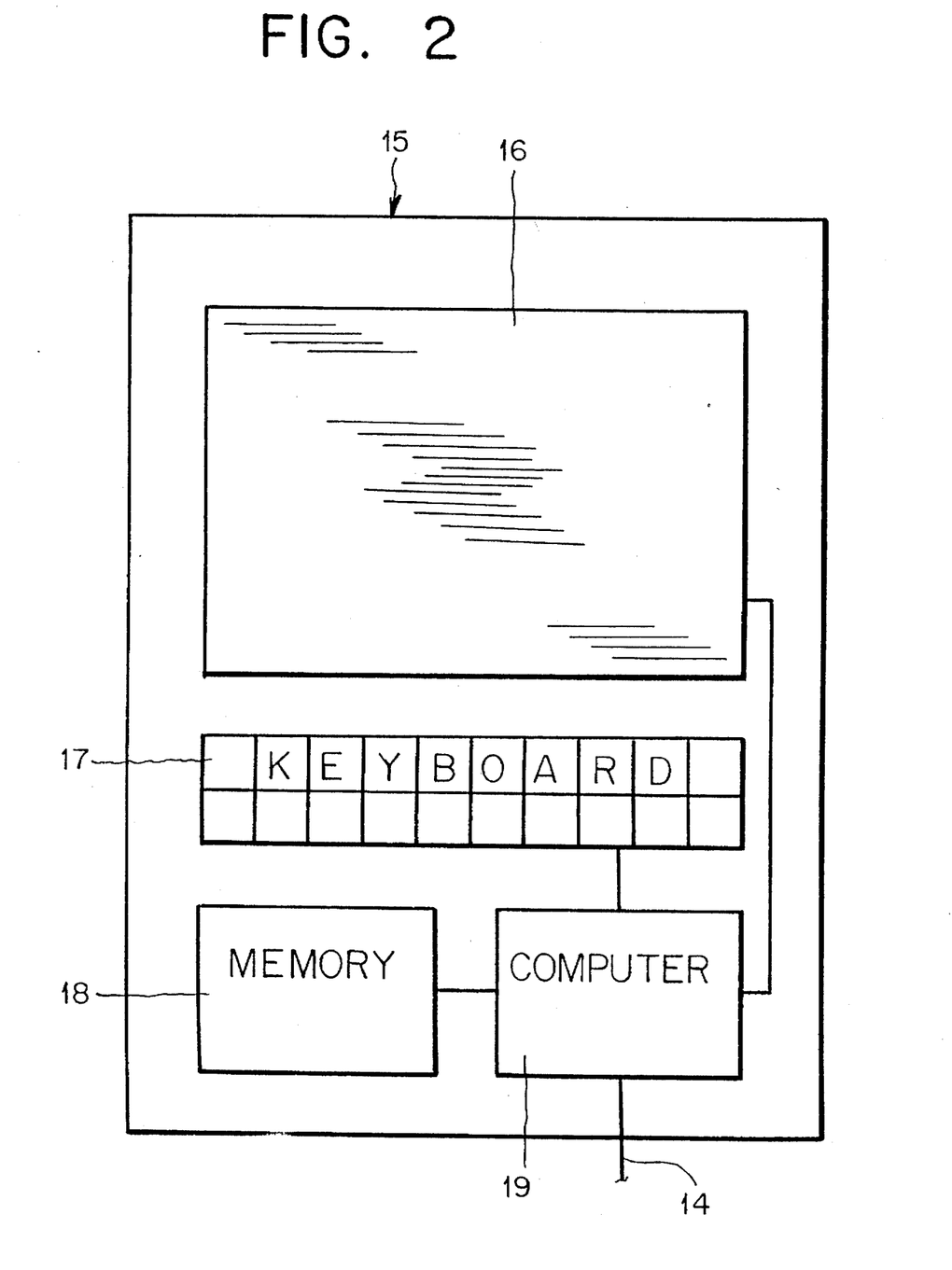
FIG. 2 shows a schematic view of an evaluation unit.

As shown in FIG. 2, an evaluation unit 15 has a display screen 16, a keyboard 17, a memory 18 and a computer 19. The evaluation unit 15 and the ultrasonic vibration sensor 1 are electrically connected to each other via the transmission line 14, with the circuit unit 10 forming an interface between the two.

The method according to the invention permits testing the same condensate discharger and also testing different condensate dischargers. Certain basic data must be present in the memory 18 of the evaluation unit 15 for each condensate discharger to be tested; such data are, in particular, data for the identification of the condensate discharger (e.g., designation of the condensate discharger and place of installation); data on the functional principle of the condensate discharger (e.g., thermally controlled, float controlled, thermodynamic); a lower threshold value SW and an upper limit value GW. Basic data have to be individually stored for each condensate discharger in the memory 18 at the latest prior to its first test, for example, after input via the keyboard 17. Both the limit value GW and the threshold value SW of a condensate discharger can be changed, if need be.

For testing a condensate discharger, its basic data are first loaded from the memory 18 of the evaluation unit 15 in the computer 19, namely, via appropriate inputs (for example, identification data) via the keyboard 17 by the person operating the testing device. Subsequently, the ultrasonic vibration sensor 1 is mechanically brought into contact with the condensate discharger to be tested using the free end of the probe rod 3. If such contacting is done with sufficient force, the stop 8 of the vibration transformer 4 is lifted from the sensor housing 2 against the action of the spring-elastic element 7, and an axial relative movement takes place between the sensor housing 2 and the vibration transformer 4 with the probe rod 3. With a predetermined contact pressure force, the path-end switch 12 is switched on by the vibration transformer 4 now acting on this switch. The axial relative movement finally ends when the stop 9 of the probe rod 3 comes to rest against the sensor housing 2, limiting the stroke.

As soon as the probe rod 3 is in mechanical contact with the condensate discharger to be tested, it picks up ultrasonic vibration if such vibration is present in the condensate discharger, and transmits such vibration to the vibration transformer 4. Here, the piezo elements 5, 6 generate an electric output signal of which the actual value conforms to instantaneous ultrasonic vibration, this signal being transmitted to the circuit unit 10 via the conductors 11. However, as long as the path-end switch 12 is not yet switched on, the condensate discharger is not yet tested in the evaluation unit 15. The test is started by the evaluation unit 15 only after the path-end switch 12 has been switched on and the signal lamp 13 is then illuminated.

After the test has been started, the evaluation unit 15 detects during a predetermined test duration time period PD at predetermined times the actual value of the output signal of the vibration transformer 4, whereby a smoothing takes place in the evaluation unit 15. For this purpose, the mean value is calculated from a number of successive values, namely, from the actual value that has to be subjected to the smoothing process, a predetermined number of actual values following this actual value, and from a predetermined number of values preceding it. The mean value is determined to be the instantaneous value in the evaluation unit 15 instead of the respective actual value. Such smoothing is repeated after each new actual value until the end of the test, whereby the oldest value of the preceding smoothing calculation is omitted in each case and the latest actual value is added. At the start of the test, all values of the smoothing calculation are actual values, and thus "unsmoothed" values. Thereafter, the preceding values entered in the smoothing calculation are increasingly instantaneous values, thus "smoothed" values.

Actual value variations can occur for a very short time without change in the function of the condensate discharger, for example, conditioned by the plant or design of the condensate discharger. However, the time between two actual-value detections is so short that many actual values are detected within a condensate discharge process. By the smoothing, instantaneous values are obtained that are representative of the function of the condensate discharger and not falsified by short-time actual value fluctuations.

Figure 3:
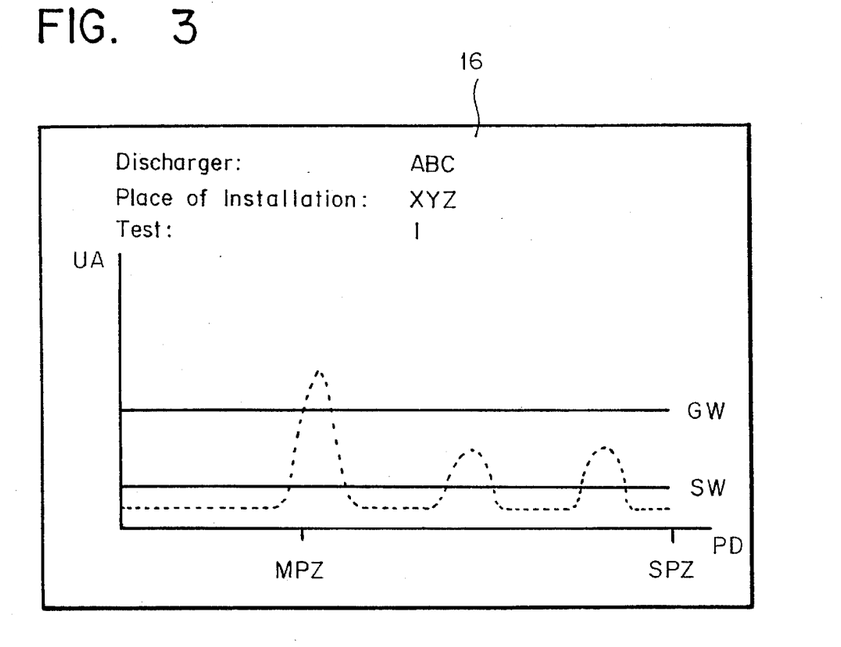
FIG. 3 shows the display screen of the evaluation unit showing a diagram of the test of an intact condensate discharger.
Figure 4:
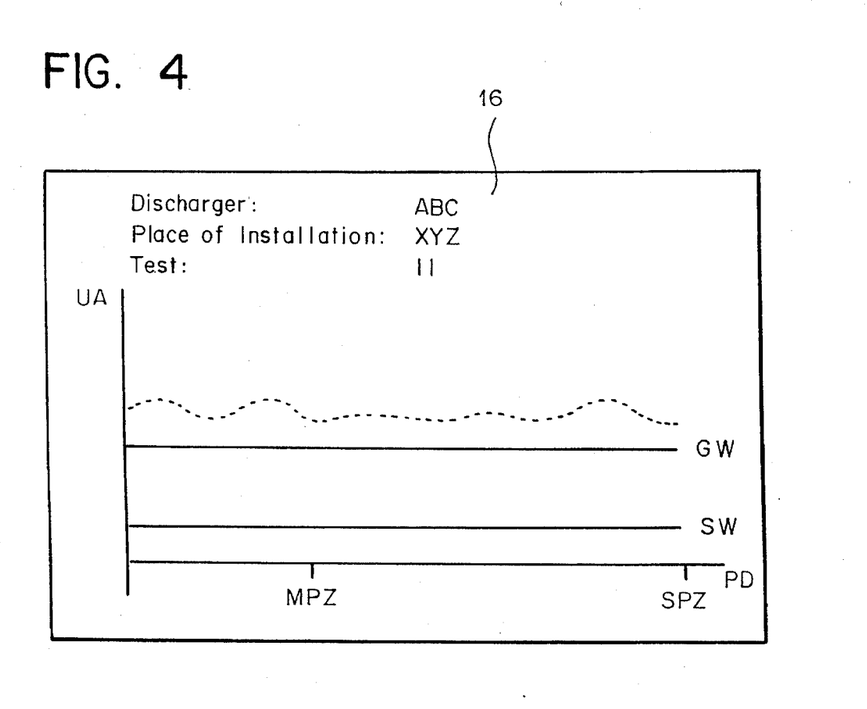
FIG. 4 shows the display screen of the evaluation unit showing the diagram of the test of a defective condensate discharger.

FIGS. 3 and 4 show how the evaluation unit 15 displays the detected instantaneous values on the display screen 16 as a diagram. Furthermore, it checks each instantaneous value as to whether it falls below the lower threshold value SW, which is contained in the basic data of the condensate discharger to be tested. These processes (detection and display of the instantaneous value; testing for whether it falls below the threshold value) are repeated by the evaluation unit 15 during the test duration time period PD at the predetermined times. In addition, the number of values falling below the threshold value is determined and the mean value is calculated from all instantaneous values picked up during the test duration time period PD. When the test duration PD expires, the signal lamp 13 is extinguished, indicating the end of the test.

However, if prior to the end of test duration time period PD, the force by which the ultrasonic vibration sensor 1 is pressed by the operator against the condensate discharger falls below the predetermined value, the path-end switch 12 moves away from the vibration transformer 4 under the action of the spring-elastic element 7. This switches the path-end switch 12 off, whereupon the evaluation unit 15 discontinues the test and discards it. This is indicated by flashing of the signal lamp 13.

Upon expiration of the test duration time period PD, and if the test was not prematurely discontinued, i.e., if the probe rod 3 was in the required intensive mechanical contact with the condensate discharger to be tested and checked during the entire test duration time period PD, the evaluation unit 15 determines the test result. For this purpose, it first checks whether there was a falling below the threshold value SW at least once during the test duration time period PD. If this was the case, the evaluation unit 15 checks on the basis of the data contained in the basic data of the condensate discharger whether the latter has a certain functional principle, e.g., thermodynamic. If it does not have such principle, the evaluation unit 15 forms a positive test result, for example "discharger O.K." However, if the condensate discharger has such a principle of function, the evaluation unit 15 compares the number of times there was a falling below the threshold value with a predetermined maximum number. If such maximum number is exceeded, the evaluation unit 15 forms a negative test result, e.g., "check discharger." If, on the other hand, the maximum number was not exceeded, the test result of the evaluation unit 15 is positive.

If, during the test duration period PD, no falling below the threshold value SW has occurred, and the condensate discharger thus did not close, the evaluation unit 15 compares the mean value of ultrasonic vibrations formed from the detected instantaneous values with the limit value GW. If the latter is not exceeded by the mean value, the evaluation unit 15 forms a positive test result. Otherwise it issues, via the display screen 16, a first query about a certain possible interfering influence, namely, about an interfering foreign sound. This query has to be answered by the operator by appropriate inputs via the keyboard 17. If an interfering foreign sound is present, the evaluation unit 15 forms as the test result an interference message, for example, "test invalid." If interfering foreign sound is missing, the evaluation unit 15 displays on the display screen 16 again a query about a certain possible interfering influence, namely whether the amount of condensate received exceeds a predetermined maximum quantity. This query, too, has to be answered by the operator via the keyboard 17. If the maximum quantity is exceeded, the evaluation unit 15 forms a positive test result, otherwise a negative one.

Figure 5:
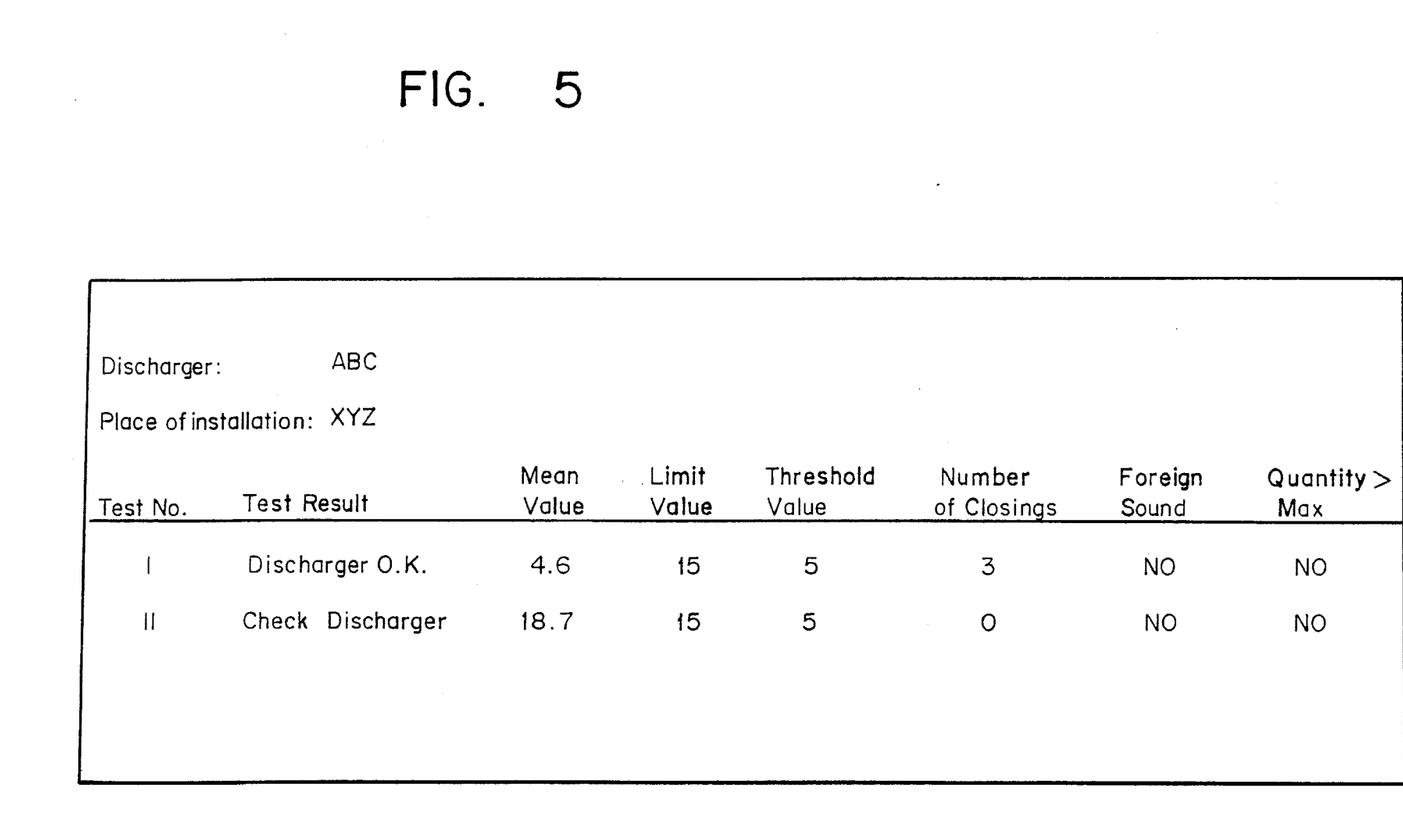
FIG. 5 shows the display screen of the evaluation unit showing a table of the important data of the tests displayed in FIGS. 3 and 4.

After the test result is available, the evaluation unit 15 displays on the display screen 16 the most important data of the test (see FIG. 5). Furthermore, it displays on the display screen 16 the query about a storage. If the operator inputs via the keyboard 17 an order for storage to the evaluation unit 15, the test data of the current test, as well as the limit value GW and threshold value SW valid in such test, are stored in the memory 18, which is accomplished with association to the tested condensate discharger and additionally to the data of any previous tests of this condensate discharger. The test data comprise the information on interfering influences that may have been entered, if necessary, all instantaneous values detected during the test duration period PD, and the data obtained from such values in evaluation unit 15, such as, for example, the mean value, the number of times the threshold value had fallen below, and, of course, the test result.

The threshold value SW is a lower value which is individually applicable to the condensate discharger to be tested or checked and contained in the basic data of this discharger. The instantaneous values fall below this threshold value if the condensate discharger is closed, i.e., if it neither discharges condensate nor permits steam to flow off. When the condensate discharger is closed, the amplitude of the detectable ultrasonic vibrations does not become zero in each case within the frequency range that is of interest. Sometimes, foreign sound of low intensity may be continuously received in the condensate discharger, for example, from the connected plant. In such cases, the height of the amplitude is by far below the ultrasonic vibrations caused when condensate or steam is flowing off in the condensate discharger and this does not basically interfere with the test of the condensate discharger. However, a closing of the condensate discharger can be clearly determined only on the basis of the threshold value SW. As a rule, a closing is a clear indication of the functionality of the condensate discharger. An exception, however, are condensate dischargers of certain functional principles, for example, thermodynamic ones. Because of their principle they close also when wear has occurred, whereby, however, the number of opening and closing processes increases substantially. Therefore, with such condensate dischargers, a high closing frequency is an indication of a functional defect.

The limit value GW represents an upper value that is individually applicable to the condensate discharger to be tested and contained in its basic data. It may be determined on the test stand and specified by the manufacturer of the respective condensate discharger. Or, for example, on a new and thus intact condensate discharger, it may be determined also by the operator directly on the plant on the basis of the data measured there.

If the mean value formed by the detected instantaneous values is below the limit value GW, no steam has flowed through the condensate discharger during the test. A mean value above the limit value may have different causes: i.e., the condensate discharger may be defective, so it is not completely closing after the collected condensate has been discharged, and steam can thus escape in a significant quantity. On the other hand, foreign sound of high intensity can be received in the condensate discharger from another sound source, for example, from a throttling point in the feed conduit of the condensate discharger, and cover the ultrasound directly produced in the latter, so that no evaluation of the function of the condensate discharger is possible. However, such interfering foreign sound can be detected by the operator in a simple way, for example, by scanning the objects within the vicinity of the condensate discharger with the ultrasonic vibration sensor 1. Finally, the amount of condensate flowing through can be very large. The order of magnitude of the collected amount of condensate is known to the operator, as a rule, or at least specified in the planning documents of the plant. In the presence of very large streams of condensate, the amplitude of the ultrasonic vibrations is about as high as when steam is flowing through. However, a large stream of condensate necessarily excludes the through-flow of steam, so that no functional defect of the condensate discharger is present and a positive test result is justified.

In FIGS. 3 and 4, the display screen 16 shows the diagrams of two tests of a thermally controlled condensate discharger. The test duration PD is plotted on the abscissa and the amplitude UA of the ultrasonic vibrations is plotted on the ordinate in the form of instantaneous values. Parallel with the abscissa, the diagrams have two additional lines of orientation, of which the lower one conforms to the threshold value SW and the upper one to the limit value GW. Furthermore, the display screen displays data for the identification of the respective test, for example, the designation of the condensate discharger, the place of installation, and the number of the test.

With the test shown in FIG. 3, the instantaneous values are clearly below the threshold value SW at the start of the test. The condensate discharger was closed during that time and neither condensate nor steam flowed off. However, ultrasonic vibrations of low intensity were received in the condensate discharger from the plant in which the tested condensate discharger is installed. For this reason, the instantaneous values were above the zero value. After about one third of the test duration time period PD, the condensate discharger had received a great surge of condensate, whereupon it opened particularly wide and quickly discharged the great surge of condensate and subsequently closed again without leakage. This caused the instantaneous values to temporarily increase above the threshold value SW and also above the limit value GW, and then to drop again to the original value. As shown by two further "peaks" in the diagram, the condensate discharger opened two more times during the test duration time period PD and in each case closed again without leakage. The amount of condensate to be discharged was in each case smaller than during the first discharge process. The instantaneous values rose above the threshold value SW, but did not reach the limit value GW in these two cases. The condensate discharger closed three times during the test and was consequently intact, so that the test result has to be positive.

In the test shown in FIG. 4, the condensate discharger did not close. Furthermore, the instantaneous values were above the limit value GW during the entire test duration time period PD, so that the mean value determined from the instantaneous values exceeds the limit value GW. In this test, the condensate discharger showed wear at its closing point and was incapable of closing without leakage. Steam flowed off through the condensate discharger during the test, which has to lead to a negative test result.

In FIG. 5, the display screen 16 shows the important data relating to the tests illustrated in the two diagrams (FIGS. 3 and 4). In addition to data for the identification of the tested condensate discharger (e.g., designation of the condensate discharger; place of installation), the representation contains a table, preferably with the following columns: "number of test," i.e., order in which the check took place; "test result," namely, the test result formed by the evaluation unit 15; "mean value," i.e., the mean value of the ultrasonic vibrations formed from all of the instantaneous values detected during the test duration time period PD; "limit value," i.e., the limit value GW which individually applies to the condensate discharger at the time of the test; "threshold value," i.e., the threshold value SW which individually applies to the condensate discharger at the time of the test; "number of closings," i.e., the number of times the threshold value was not reached during the test duration time period PD, thus the number of closing processes of the condensate discharger; "foreign sound" and "quantity>max," whereby "No" in both columns means that either no query to this extent was raised by the evaluation unit 15 or such a query was answered in the negative by the operator.

The table in FIG. 5 shows that in the test according to FIG. 3, the closing number was 3 and the mean value was clearly below the limit value GW. From this results the positive test result "discharger O.K." In the test according to FIG. 4, the closing number came to 0 and, furthermore, the mean value exceeded the limit value GW, which led to the negative test result "check discharger."

It is possible to display in each case for one condensate discharger the stored data of all tests that have been carried out, so that it is possible to obtain an overview of the function of the condensate discharger. In this connection, the mean value can very easily indicate a tendency in the functional behavior of the condensate discharger. For each test, the associated diagram with the instantaneous values can be inspected. All of this is possible not only for one single, but for a great number of the same, or different, condensate dischargers.

A further embodiment of the invention permits a test which is optimized with respect to time. In this case, the evaluation unit 15, after the basic data of the condensate discharger to be tested have been loaded, checks whether provision has been made for the time optimization in connection with is functional principle (e.g., thermally controlled, float controlled). If no provision has been made for time optimization (e.g., for a thermodynamic condensate discharger), the test duration time period PD extends over a standard test time SPZ (e.g., 30 seconds). With permissible time optimization, the evaluation unit 15 queries via the display screen 16 prior to the start of the test whether a time optimization is to take place. If the reply by the operator is NO by an input to this extent via the keyboard 17, the aforementioned standard test time SPZ applies to the test duration time period PD. If the reply is in the affirmative, the test extends at least over a minimum test time MPZ (e.g., 10 seconds). If, until the minimum test time MPZ has been reached, at least one falling below the threshold value has occurred, the test duration time period PD ends and thus the test ends when the minimum test time MPZ has been reached. Otherwise, the test duration time period PD ends as soon as one fall below the threshold value has occurred between the minimum test time MPZ and the standard test time SPZ. Without such falling below, the test duration time period PD extends over the full standard test time SPZ.

If, for example, the test illustrated in FIG. 3 had been carried out under the premise "time optimization," the test duration time period PD would have ended already shortly upon expiration of the minimum test time MPZ, namely, after the tested condensate discharger opened and closed again the first time. In the test according to FIG. 4, the test duration time period PD would have extended over the full standard test time SPZ in spite of the premise "time optimization," because the instantaneous values did not once fall below the threshold value SW.

The evaluation unit 15 can be equipped with interfaces for transmitting data to a printer or for the data exchange with another computer.

Figure 6A:
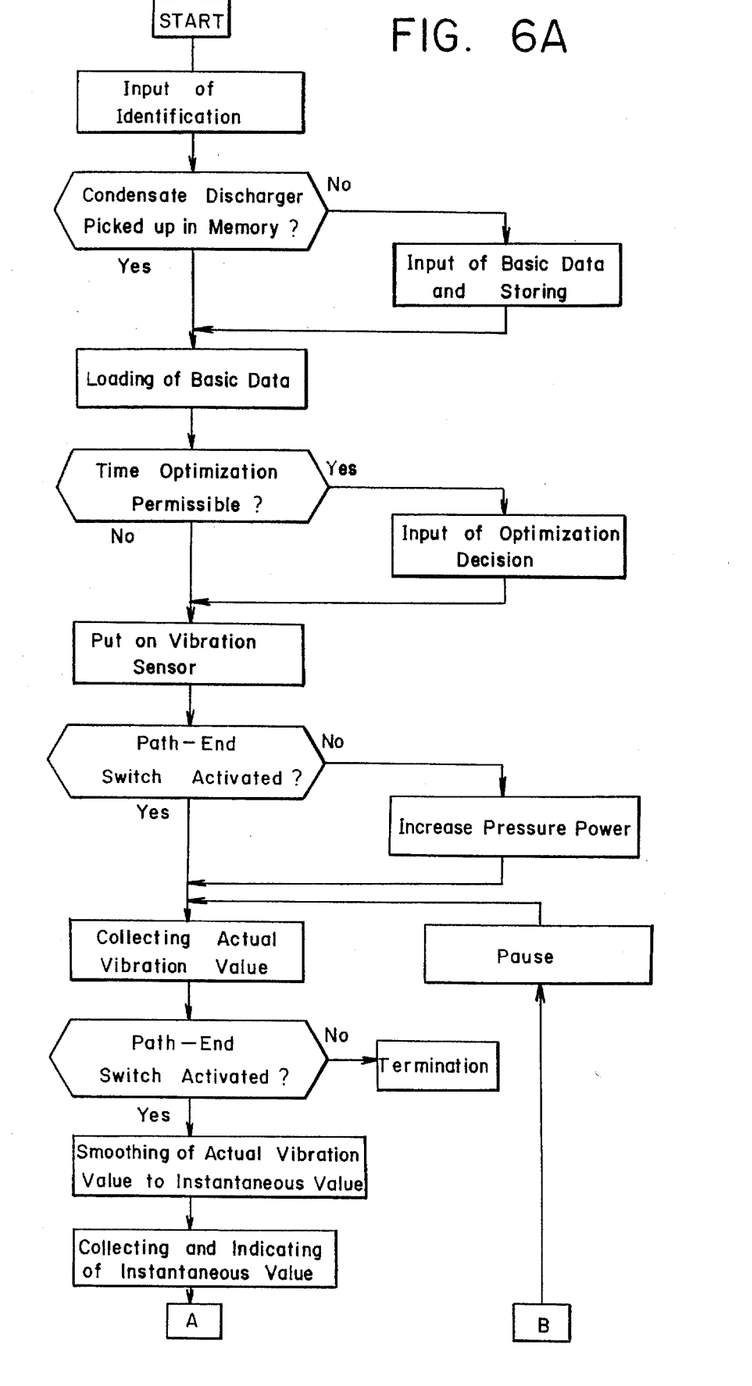
FIGS. 6A, 6B, and 6C are a flow chart of the process according to the invention showing the sequential operation of the process.
Figure 6B:
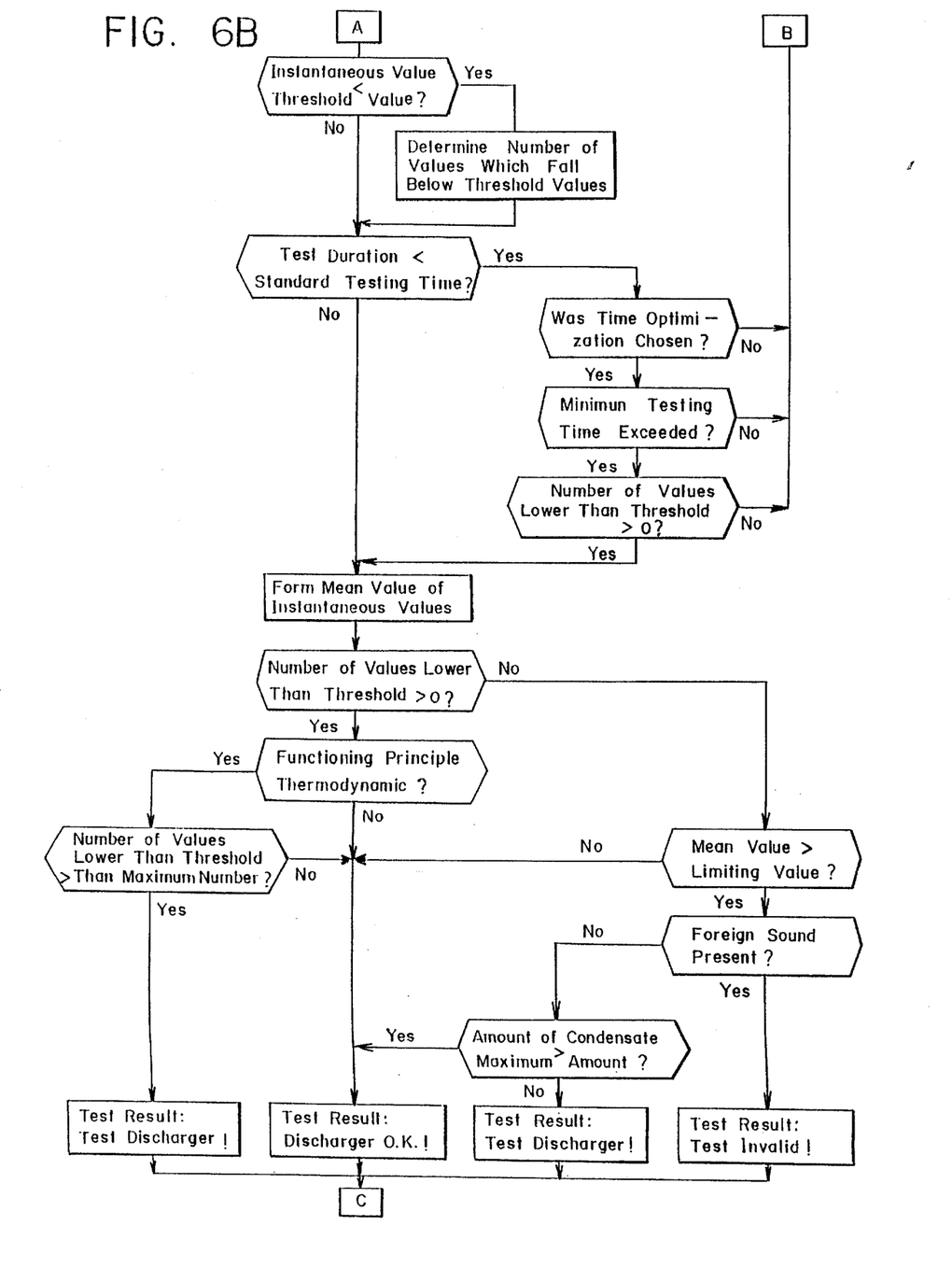
Figure 6C:
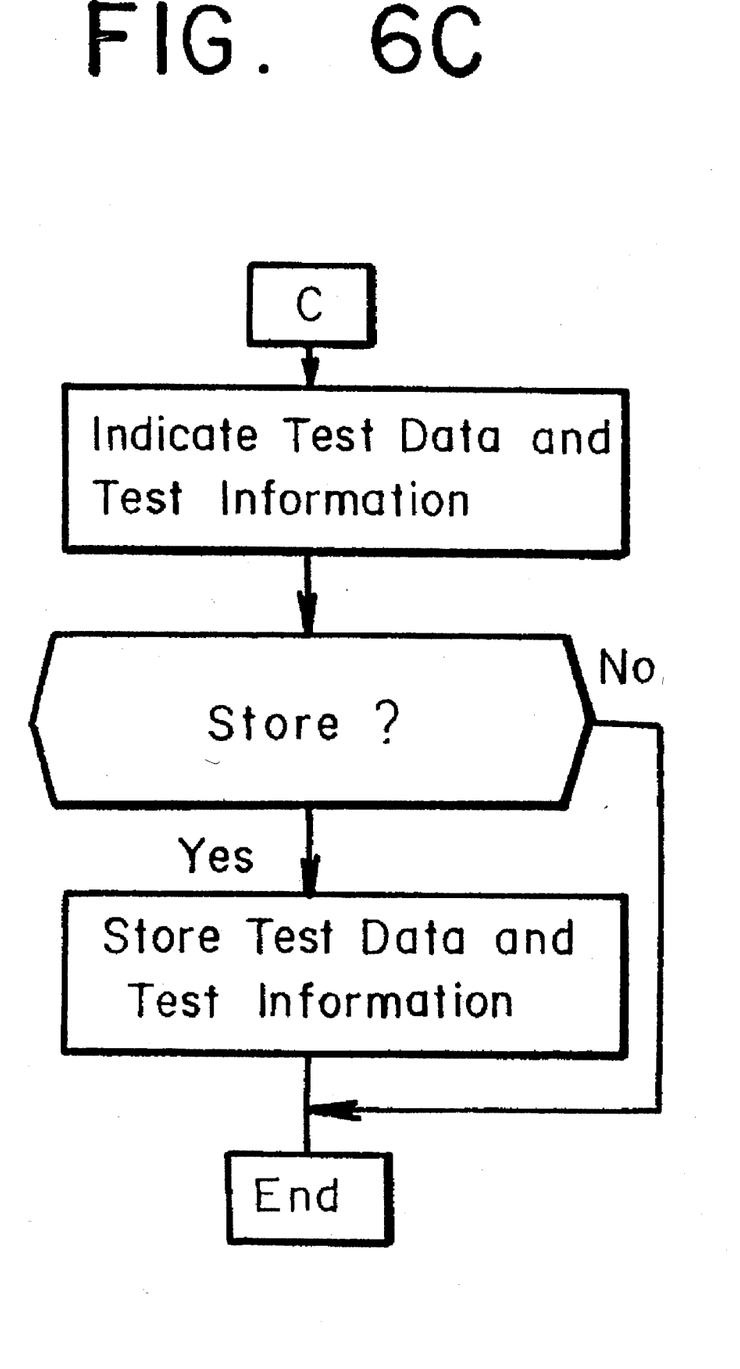

FIGS. 6A, 6B, and 6C are a flow chart of the process according to the invention showing the sequential operation of the process.

While several embodiments of the present invention have been shown and described, it is to be understood that many changes and modifications may be made thereunto without departing from the spirit and scope of the invention as defined in the appended claims.

What is claimed is:

1. Method of testing condensate dischargers, comprising the steps of:

bringing an ultrasonic vibration sensor into mechanical contact with a condensate discharger to be tested;

picking up with the ultrasonic vibration sensor ultrasonic vibrations occurring in the condensate discharger and transforming said vibrations into an electric output signal of said vibration sensor;

detecting the instantaneous value of said output signal of said ultrasonic vibration sensor in an evaluation unit at predetermined time periods;

comparing the instantaneous value in the evaluation unit with data stored in a memory;

upon expiration of the test duration, determining a test result in the evaluation unit on the basis of predetermined decision criteria and of at least one of the instantaneous values; and issuing the test result.

2. Method according to claim 1, wherein the force by which the ultrasonic vibration sensor is placed on the condensate discharger to be tested is monitored with a path-end switch; the test is started in the evaluation unit after the path-end switch has been switched on, and the test is discarded if the path-end switch is switched off during the test duration.

3. Method according to claim 1, comprising:

subjecting to a smoothing the actual values of the output signal of the ultrasonic vibration sensor present at the predetermined times;

picking up the values obtained from the actual values by smoothing in the evaluation unit as instantaneous values; and the times are predetermined in such a way that a great number of actual values are collected within one condensate discharge process.

4. Method according to claim 3, wherein for smoothing, forming the mean value from the respective actual value, a predetermined number of actual values following said actual value, and a predetermined number of values preceding said value, and picking up said mean value as the instantaneous value.

5. Method according to claim 1, wherein upon completion of the test, a request is issued to the operator by the evaluation unit, and after the memory order has been placed, the test data are stored in the memory associated with the tested condensate discharger, in addition to the test data of preceding tests of this condensate discharger.

6. Method according to claim 5, further comprising:

storing the information input, on interfering influences, the instantaneous values picked up during the test duration and the data obtained therefrom in the evaluation unit as test data.

7. Method according to claim 1, comprising:

displaying on a display screen all instantaneous values picked up during the test duration, an upper limit value, and a lower threshold value.

8. Method according to claim 7, comprising:

representing the values on the display screen as a diagram, of which one coordinate represents the test duration and its other coordinate the amplitude of the ultrasonic vibrations.

9. Method according to claim 1, comprising displaying the information input, on interfering influences, and the data obtained in the evaluation unit from the instantaneous values on a display screen.

10. Method according to claim 9, comprising:

displaying in addition to the information and data of the actual test, the information and data stored in the memory on preceding tests of the condensate discharger, in the form of a table.

11. Method according to claim 1, comprising:

forming a mean value in the evaluation unit from all instantaneous values picked up during the test duration; and comparing the mean value with an upper limit value, whereby a mean value below the limit value results in a positive test result.

12. Method according to claim 11, comprising:

storing an upper limit value in the memory for each condensate discharger to be tested, with association for the respective condensate discharger.

13. Method according to claim 11, wherein the evaluation unit requests the operator to input information about certain possible interfering influences if the mean value exceeds the limit value, and the input information forms additional decision criteria for the determination of the test result.

14. Method according to claim 1, wherein during the test duration, comparing each detected instantaneous value in the evaluation unit with a lower threshold value, whereby if the instantaneous value falls below the threshold value, a positive test result ensues.

15. Method according to claim 14, comprising:

storing in the memory a lower threshold value for each condensate discharger to be tested, each threshold value associated with the respective condensate discharger.

16. Method according to claim 14, wherein a standard test time and a shorter minimum test time are predetermined for the test duration and provision is made for a selection between a standard test and a time-optimized test, and that in the standard test, the test duration always extends over the full standard test time, whereas with the time-optimized test, the test duration ends between the minimum test time and the standard test time provided at least one instantaneous value falls below the threshold value.

17. Method according to claim 14, wherein in the memory of the evaluation unit, data characterizing the functional principle are stored for each condensate discharger to be tested; that during the test duration, it is determined in the evaluation unit how frequently instantaneous values fell below the threshold value; and that upon expiration of the test duration, the number of such below values is compared with a predetermined maximum number, whereby an exceeding of the maximum number results in a negative test result with condensate dischargers having a certain functional principle.

* * * * *